United States Patent
Werner et al.

(10) Patent No.: US 10,083,792 B2
(45) Date of Patent: Sep. 25, 2018

(54) SYSTEM, METHOD AND APPARATUS FOR REDUCING THE HEIGHT OF BIPOLAR TRANSMITTERS AND/OR RECEIVERS IN ELECTRIC VEHICLE CHARGING

(71) Applicant: QUALCOMM Incorporated, San Diego, CA (US)

(72) Inventors: Michael Werner, Markt Schwaben (DE); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 761 days.

(21) Appl. No.: 14/277,514

(22) Filed: May 14, 2014

(65) Prior Publication Data

US 2015/0332845 A1 Nov. 19, 2015

(51) Int. Cl.
 *H01F 38/14* (2006.01)
 *H02J 50/00* (2016.01)
 (Continued)

(52) U.S. Cl.
 CPC ........... *H01F 38/14* (2013.01); *H01F 27/365* (2013.01); *H01F 27/38* (2013.01); *H02J 5/005* (2013.01);
 (Continued)

(58) Field of Classification Search
 CPC ........ H01F 38/14; H01F 2038/143–2038/146; H02J 5/005; H02J 7/025; H02J 17/00;
 (Continued)

(56) References Cited

U.S. PATENT DOCUMENTS

| 7,521,890 B2 | 4/2009 | Lee et al. |
| 2010/0007215 A1* | 1/2010 | Sakuma .................. H01F 38/14 307/104 |

(Continued)

FOREIGN PATENT DOCUMENTS

| CN | 101630562 B | 2/2013 |
| EP | 2546999 A2 | 1/2013 |

(Continued)

OTHER PUBLICATIONS

International Search Report and Written Opinion—PCT/US2015/022514—ISA/EPO—Oct. 12, 2015.

(Continued)

*Primary Examiner* — Rexford Barnie
*Assistant Examiner* — Thai Tran
(74) *Attorney, Agent, or Firm* — Knobbe, Martens, Olson & Bear, LLP (57) ABSTRACT

Systems, methods and apparatuses for reducing the height of bipolar transmitters and/or receivers in electric vehicle charging and/or power transfer are described herein. One implementation may include an apparatus for wireless power transfer. The apparatus comprises a ferromagnetic layer comprising at least one portion having a reduced thickness. The apparatus further comprises a first coil having at least one portion countersunk into the at least one portion of the ferromagnetic layer having the reduced thickness. The apparatus further comprises a second coil overlapping the at least one countersunk portion of the first coil. The at least one portion having the reduced thickness comprises a recess in the ferromagnetic layer. The ferromagnetic layer comprises a first plurality of ferromagnetic tiles having a first thickness and the at least one portion having the reduced thickness comprises a second plurality of ferromagnetic tiles having the reduced thickness.

26 Claims, 8 Drawing Sheets

(51) Int. Cl.
*H02J 50/10* (2016.01)
*H02J 50/12* (2016.01)
*H02J 50/70* (2016.01)
*H02J 50/40* (2016.01)
*H01F 27/36* (2006.01)
*H01F 27/38* (2006.01)
*H02J 5/00* (2016.01)
*H04B 5/00* (2006.01)
*H02J 7/02* (2016.01)

(52) U.S. Cl.
CPC .............. *H02J 7/025* (2013.01); *H02J 50/12* (2016.02); *H02J 50/40* (2016.02); *H02J 50/70* (2016.02); *H04B 5/0037* (2013.01)

(58) Field of Classification Search
CPC .... H04B 5/0025–5/0093; B60L 11/182; B60L 11/1829–11/1831; Y02T 90/122; A61B 1/00029; A61N 1/3787
USPC .......................................... 307/104; 320/108
See application file for complete search history.

(56) References Cited

U.S. PATENT DOCUMENTS

| | | | | |
|---|---|---|---|---|
| 2010/0308939 A1* | 12/2010 | Kurs | ....................... | H02J 5/005 333/219.2 |
| 2012/0169139 A1* | 7/2012 | Kudo | ..................... | H02J 17/00 307/104 |
| 2012/0248892 A1 | 10/2012 | Covic et al. | | |
| 2013/0015718 A1* | 1/2013 | Jung | .................... | H04B 5/0037 307/104 |
| 2013/0234509 A1 | 9/2013 | Ichikawa et al. | | |
| 2013/0293191 A1 | 11/2013 | Hidaka et al. | | |
| 2013/0335018 A1 | 12/2013 | Ichikawa | | |
| 2015/0054457 A1* | 2/2015 | Kim | ........................ | H01F 38/14 320/108 |

FOREIGN PATENT DOCUMENTS

| | | | |
|---|---|---|---|
| EP | 2595160 A2 | 5/2013 | |
| KR | 100971705 B1 * | 7/2010 | |
| KR | 100971705 B1 | 7/2010 | |
| WO | WO-2013019122 A1 | 2/2013 | |
| WO | WO-2013065245 A1 | 5/2013 | |
| WO | WO-2013122483 A1 | 8/2013 | |
| WO | WO-2014011059 A1 | 1/2014 | |

OTHER PUBLICATIONS

Partial International Search Report—PCT/US2015/022514—ISA/EPO—Jul. 2, 2015.

* cited by examiner

SYSTEM, METHOD AND APPARATUS FOR REDUCING THE HEIGHT OF BIPOLAR TRANSMITTERS AND/OR RECEIVERS IN ELECTRIC VEHICLE CHARGING

TECHNICAL FIELD

The described technology generally relates to wireless power. More specifically, the disclosure is directed to systems, methods and apparatuses for reducing the height of bipolar transmitters and/or receivers in electric vehicle charging.

BACKGROUND

For "Crosspolar", also termed "Bipolar", charging or power transfer systems, two coils are overlapped in order to influence the magnetic field structure by, for example, driving the two coils with different current magnitudes and/or phases. In the general case, the magnetic field structure as generated by a "Crosspolar" or "Bipolar" system is composed of both a vertically and horizontally polarized magnetic moment. Because the windings of the two coils overlap, the pad height may be at least one litz wire thickness higher than a comparable single coil system, e.g., a conventional "Double D" or "Q" coil system. This increased thickness can result in a height increase of the base pad by up to 20%. For example, in some implementations, where a base pad without overlapping coils has a height of 30 millimeters (mm) and where a copper litz wire used to form the coils has an approximate thickness of 5 mm, a conventional base pad having overlapping coils may have an increased thickness of approximately 35 mm. This is undesirable for both technical and aesthetic reasons. Thus, there is a need for systems, methods and apparatuses for reducing the height of bipolar transmitters and/or receivers in electric vehicle wireless charging and/or power transfer.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for wireless power transfer. The apparatus comprises a ferromagnetic layer comprising at least one portion having a reduced thickness. The apparatus further comprises a first coil having at least one portion countersunk into the at least one portion of the ferromagnetic layer having the reduced thickness. The apparatus further comprises a second coil overlapping the at least one countersunk portion of the first coil.

Another aspect of the disclosure provides a method for wireless power transfer. The method comprises wirelessly transmitting or receiving power via a first coil having at least one portion countersunk into the at least one portion of a ferromagnetic layer having a reduced thickness. The method further comprises wirelessly transmitting or receiving power via a second coil overlapping the at least one countersunk portion of the first coil.

Another aspect of the disclosure provides an apparatus for wireless power transfer. The apparatus comprises means for channeling magnetic flux comprising at least one portion having a reduced thickness. The apparatus additionally comprises first means for generating an electromagnetic field having at least one portion countersunk in the at least one portion of the means for channeling magnetic flux having the reduced thickness. The apparatus additionally comprises second means for generating an electromagnetic field overlapping the at least one countersunk portion of the first means for generating an electromagnetic field.

Another aspect of the disclosure provides an apparatus for wireless power transfer. The apparatus comprises a first coil having a first center point. The apparatus further comprises a second coil having a second center point and overlapping a portion of the first coil, the first and second coils having a common axis between the first and second center points, wherein the first and second coils each have a first dimension substantially parallel to the common axis that is shorter than a respective second dimension that are each substantially perpendicular to the common axis.

Another aspect of the disclosure provides a method for wireless power transfer. The method comprises wirelessly transmitting or receiving power via a first coil having a first center point. The method further comprises wirelessly transmitting or receiving power via a second coil having a second center point and overlapping a portion of the first coil, the first and second coils having a common axis between the first and second center points, wherein the first and second coils each have a first dimension substantially parallel to the common axis that is shorter than a respective second dimension that are each substantially perpendicular to the common axis.

Another aspect of the disclosure provides an apparatus for wireless power transfer. The apparatus comprises first means for generating an electromagnetic field having a first center point. The apparatus additionally comprises second means for generating an electromagnetic field having a second center point and overlapping a portion of the first means for generating an electromagnetic field. The first and second means for generating an electromagnetic field have a common axis between the first and second center points. The first and second means for generating an electromagnetic field each have a first dimension substantially parallel to the common axis that is shorter than a respective second dimension that are each substantially perpendicular to the common axis.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coil" to achieve power transfer.

Figure 1:
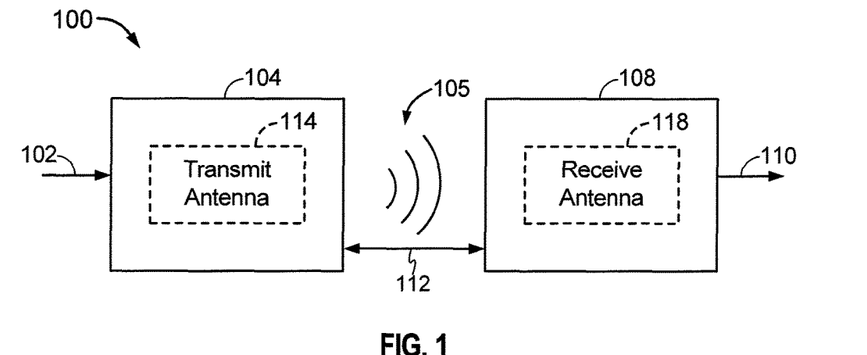
FIG. 1 is a functional block diagram of a wireless bipolar power transfer system, in accordance with one exemplary implementation.

FIG. 1 is a functional block diagram of a wireless bipolar power transfer system 100, in accordance with one exemplary implementation. An input power 102 may be provided to a transmitter 104 from a power source (not shown) to generate a wireless (e.g., magnetic or electromagnetic) field 105 for performing energy transfer. A receiver 108 may couple to the wireless field 105 and generate an output power 110 for storing or consumption by a device (not shown) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. In some implementations, the transmitter 104 may comprise a bipolar transmitter. For example, the transmitter 104 may include a plurality of electrically isolated, overlapping transmit coils 114 for transmitting energy to the receiver 108. The receiver 108 may include a receive coil 118 for receiving or capturing energy transmitted from the transmitter 104. The near-field may correspond to a region in which there are strong reactive fields resulting from the currents and charges in the transmit coils 114 that minimally radiate power away from the transmit coils 114. The near-field may correspond to a region that is within about one wavelength (or a fraction thereof) of the transmit coils 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coils 114 and the receive coil 118. The area around the transmit coils 114 and the receive coil 118 where this coupling may occur is referred to herein as a coupling-mode region.

Figure 2:
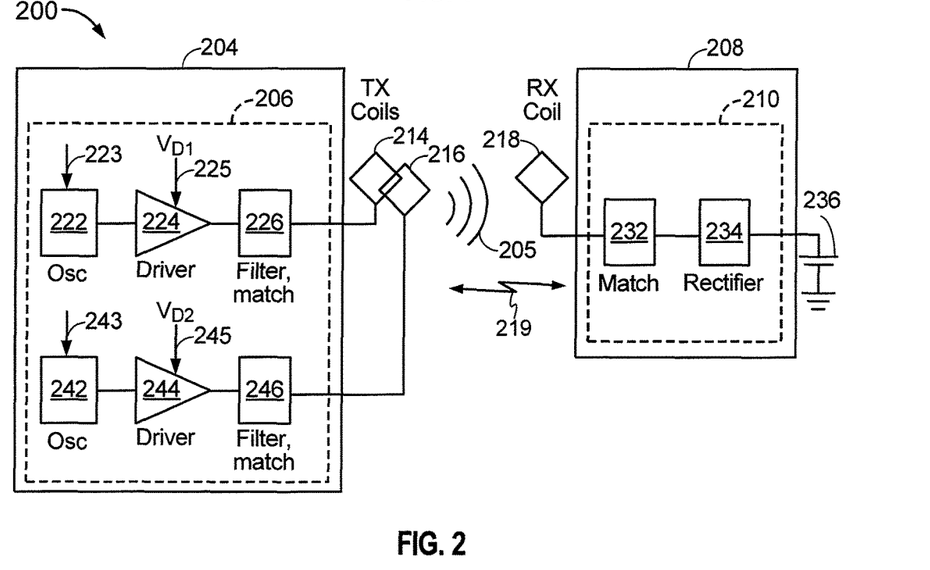
FIG. 2 is a functional block diagram of a bipolar wireless power transfer system, in accordance with another exemplary implementation.

FIG. 2 is a functional block diagram of a wireless bipolar power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The transmit circuitry 206 may include or be controlled by a controller (not shown). The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coil 214 at, for example, a resonant frequency of a first transmit coil 214 based on an input voltage signal ($V_{D1}$) 225. The filter and matching circuit 226 may filter out harmonics or other unwanted frequencies and match the impedance of the transmitter 204 to the first transmit coil 214.

The transmit circuitry 206 may additionally include another oscillator 242 receiving a frequency control signal 243, a driver 244 receiving an input voltage signal ($V_{D2}$) 245, a filter and matching circuit 246, and a second transmit coil 216. Each of the oscillator 242, the driver 244, the filter and matching circuit 246, and the second transmit coil 216 may function substantially as described above with respect to the oscillator 222, the driver circuit 224, the filter and matching circuit 226, and the first transmit coil 214, respectively. In some implementations, a common oscillator 222, driver circuit 224, and/or filter and matching circuit 226 may be may be provided for both the first and second transmit coils 214/216. As a result of driving the first transmit coil 214 and the second transmit coil 216, the transmit coils 214/216 may generate a wireless field 205 to wirelessly output power at a level sufficient for charging a battery 236 of an electric vehicle, for example.

The receiver 208 may include a receive circuitry 210 that may include a matching circuit 232 and a rectifier circuit 234. The matching circuit 232 may match the impedance of the receive circuitry 210 to the receive coil 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205. The receiver 208 may be configured to determine whether an amount of power transmitted by the transmitter 204 and received by the receiver 208 is appropriate for charging the battery 236.

Figure 3:
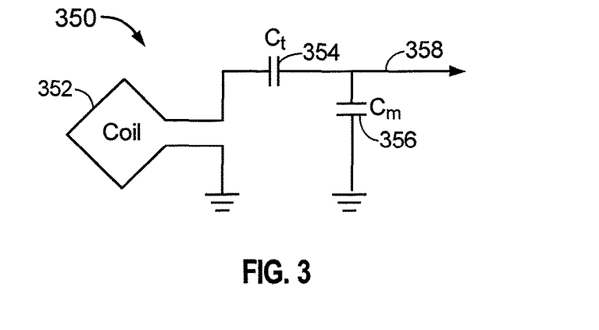
FIG. 3 is a schematic diagram of a portion of transmit circuitry or receive circuitry of FIG. 2 including a transmit or receive coil, in accordance with exemplary implementations.

FIG. 3 is a schematic diagram of a portion of the transmit circuitry 206 or the receive circuitry 210 of FIG. 2 including a transmit or receive coil, in accordance with exemplary implementations. As illustrated in FIG. 3, a transmit or receive circuitry 350 may include a coil 352. The coil 352 may also be referred to or be configured as a "loop" coil 352. The coil 352 may also be referred to herein or be configured as a "magnetic" coil or an induction coil. The term "coil" generally refers to a component that may wirelessly output or receive energy for coupling to another "coil." The coil may also be referred to as a coil of a type that is configured to wirelessly output or receive power. The coil may also be referred to as an antenna of a type that is configured to wirelessly output or receive power. As used herein, the coil 352 is an example of a "power transfer component" of a type that is configured to wirelessly output and/or receive power.

The coil 352 may include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 may be more powerful.

As stated, efficient transfer of energy between the transmitter 104/204 and the receiver 108/208 may occur during matched or nearly matched resonance between the transmitter 104/204 and the receiver 108/208. However, even when resonance between the transmitter 104/204 and receiver 108/208 are not matched, energy may be transferred, although the efficiency may be affected. For example, the efficiency may be less when resonance is not matched. Transfer of energy occurs by coupling energy from the wireless field 105/205 of the transmit coils 114/214/216 to the receive coil 118/218, residing in the vicinity of the wireless field 105/205, rather than propagating the energy from the transmit coil 114/214 into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter coils, the size of capacitance needed to sustain resonance may decrease as the diameter or inductance of the loop increases.

Furthermore, as the diameter of the coil increases, the efficient energy transfer area of the near-field may increase. Other resonant circuits formed using other components are also possible. As another non-limiting example, a capacitor may be placed in parallel between the two terminals of the circuitry 350. For transmit coils, the signal 358, with a frequency that substantially corresponds to the resonant frequency of the coil 352, may be an input to the coil 352.

Referring to FIGS. 1 and 2, the transmitter 104/204 may output a time varying magnetic (or electromagnetic) field with a frequency corresponding to the resonant frequency of the transmit coils 114/214/216. When the receiver 108/208 is within the wireless field 105/205, the time varying magnetic (or electromagnetic) field may induce a voltage in the receive coil 118/218. As described above, if the receive coil 118/218 is configured to resonate at the frequency of the transmit coils 114/214/216, energy may be efficiently transferred. The AC signal generated in the receive coil 118/218 may be rectified as described above to produce a DC signal that may be provided to charge or to power a load.

Figure 4:
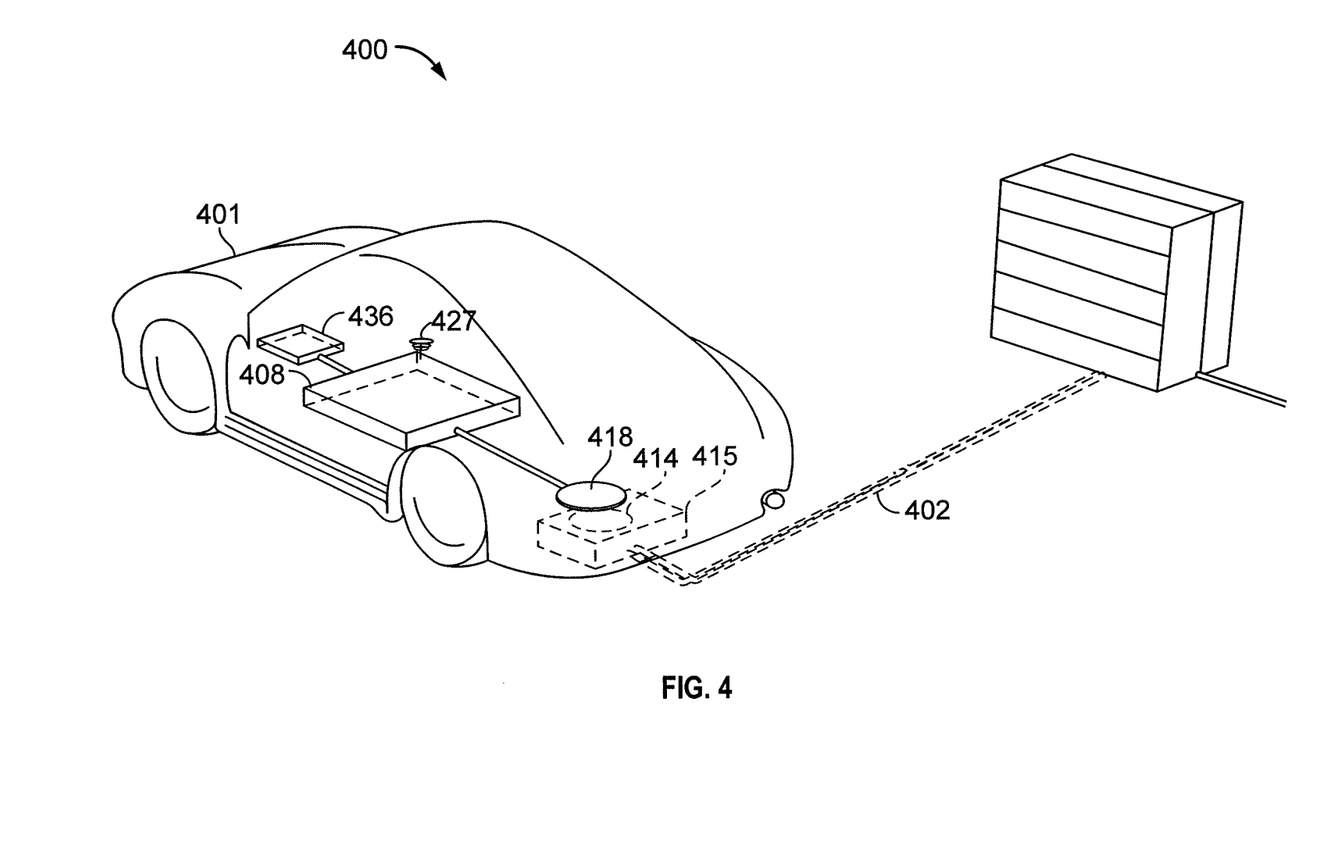
FIG. 4 is a diagram of a vehicle aligned over a wireless bipolar power transfer system, in accordance with an exemplary implementation.

FIG. 4 is a diagram 400 of a vehicle aligned over a wireless power transfer system 400, in accordance with an exemplary implementation. The wireless power transfer system 400 enables charging of the vehicle 401 while the vehicle 401 is parked near the transmitter 415, also called a base pad 415. Space is shown for the vehicle 401 to be parked over the transmitter 415. Transmit coils 414 may be located within the transmitter 415 (e.g., base pad). In some implementations, the transmitter 415 may be connected to a power backbone 402 and may be configured to provide an alternating current (AC) to the transmit coils 414. The vehicle 401 may include a battery 436, a receive coil 418, and an antenna 427 each connected to the receiver 408.

In some implementations, the receive coil 418 may receive power when the receive coil 418 is located in a wireless (e.g., magnetic or electromagnetic) field produced by the transmit coils 414. The amount of power transferred via the transmit coils 414 may be an amount sufficient to charge a battery of the vehicle 401 or to power a load of the vehicle 401. For example, the amount of power transferred may be on the order of kilowatts. The wireless field corresponds to a region where energy output by the transmit coils 414 may be captured by the receive coil 418. In some cases, the wireless field may correspond to the "near field" of the transmit coils 414.

Figure 5:
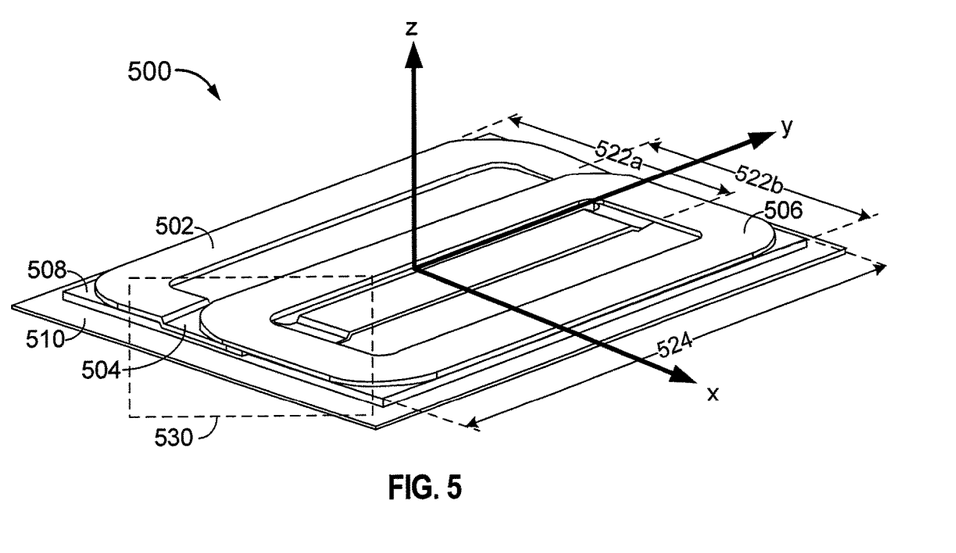
FIG. 5 is a diagram of a bipolar wireless power transfer system, in accordance with an exemplary implementation.

FIG. 5 is a diagram 500 of a bipolar wireless power transfer system 500, in accordance with an exemplary implementation. As shown, the bipolar wireless power transfer system 500 may include a first coil 502, a second coil 506, a ferromagnetic layer 508 and a shield layer 510. The ferromagnetic layer 508 may comprise ferrite, for example. The shield layer 510 may comprise aluminum, for example, and may serve to shield or prevent any stray magnetic or electromagnetic fields generated by the first 502 or second coils 506 from extending beneath the shield layer 510. Where the shield layer 510 is utilized, it may be desirable to have a gap between the shield layer 510 and the first and second coils 502/506. The second coil 506 may overlap the first coil 502. In some implementations, the first coil 502 and the second coil 506 may have a substantially rectangular shape. However, the present application is not so limited and the first coil 502 and the second coil 506 may have any suitable shape including but not limited to an elliptical or oval shape. When driven by separate currents having different magnitudes and/or phases, an aggregate magnetic field structure formed by the first coil 502 and the second coil 506 may be adjusted. However, in contrast to certain bipolar system designs, where coils are bent one over another, the first coil 502 may be bent under the second coil 506, while the second coil 506 may be substantially planar and not bent over or under the first coil 502. Where the first coil 502 is bent under the second coil 506, at least a portion 504 of the first coil 502 may be countersunk into the underlying ferromagnetic layer 508. Thus, where the portion 504 of the first coil 502 is countersunk into the ferromagnetic layer 508, the ferromagnetic layer 508 may have at least one portion 512 (shown in more detail in FIG. 6 below) having a reduced thickness. This allows for a reduced total thickness of the bipolar wireless power transfer system 500 since no added thickness is incurred where the first coil 502 and the second coil 506 overlap. Although not specifically numbered, the first coil 502 may have an additional countersunk portion (not shown) similar to the portion 512 located at the opposite side of the first coil 502, as viewed along the "y" axis, where the second coil 506 again overlaps the first coil 502.

Figure 6:
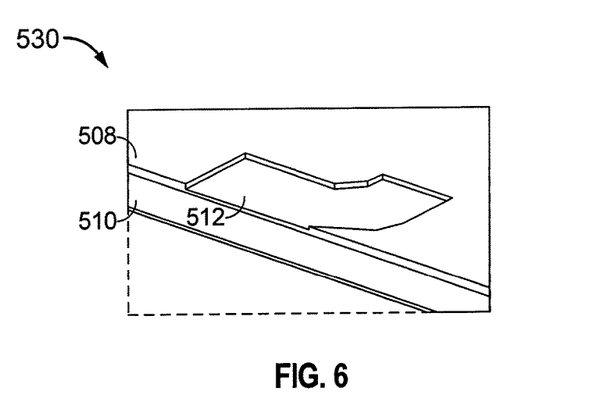
FIG. 6 is a diagram showing a magnified view of a ferromagnetic layer having a portion having a reduced thickness as integrated in the bipolar wireless power transfer system of FIG. 5.

FIG. 6 is a diagram showing a magnified view 530 of a ferromagnetic layer 508 having a portion 512 having a reduced thickness as integrated in the bipolar wireless power transfer system 500 of FIG. 5. As shown, magnified view 530 shows the ferromagnetic layer 508 and the shield layer 510 with the first coil 502 and the second coil 506 removed for easy visualization. Where the portion 504 of the first coil 502 is bent under the second coil 506, the portion 512 of the ferromagnetic layer 508 may have a reduced thickness as compared to the thickness of the rest of the ferromagnetic layer 508. In some implementations, the first coil 502 may only be countersunk into the ferromagnetic layer 508 at the portions where the second coil 506 overlaps the first coil 502. In some implementations, the portion of ferromagnetic layer 508 having a reduced thickness may include a recess in the ferromagnetic later. In addition, in some implementations the portion 512 may be formed by using thinner ferromagnetic tiles for the portion 512 and thicker ferromagnetic tiles for the remainder of the ferromagnetic layer 508. Alternatively, in some other implementations, the portion 512 may be formed by machining the thicker ferromagnetic tiles to have the reduced thickness. Thus, the portion 512 may have a shape substantially the same as the countersunk portion 504 of the first coil 502. In some implementations, the portion 512 may have a substantially rectangular shape (not shown) such that the portion 504 of the first coil 502 fits within the portion 512. In some other implementations, the reduced thickness may comprise a complete removal of the portion 512 of the ferromagnetic layer 508. In such a case, the shield layer 510 may also be completely removed under the portion 512. Thus, by bending the first coil 502 under the second coil 506 and countersinking the bent portion 504 of the first coil 502 into a portion 512 of the ferromagnetic layer 508 having the reduced thickness, the overall thickness of the bipolar wireless power transfer system 500 may be reduced as compared to certain bipolar designs. Moreover, the bipolar wireless power transfer system 500 may achieve substantially similar inductance, coupling, current, efficiency and power loss measures as compared to bipolar designs having substantially the same coil dimensions and power ratings. It is noted that the bipolar wireless power transfer system 700 of FIG. 7 may be configured to act as a transmitter configured to a field for transferring power or receiver configured to wirelessly receive power via a field.

Figure 7:
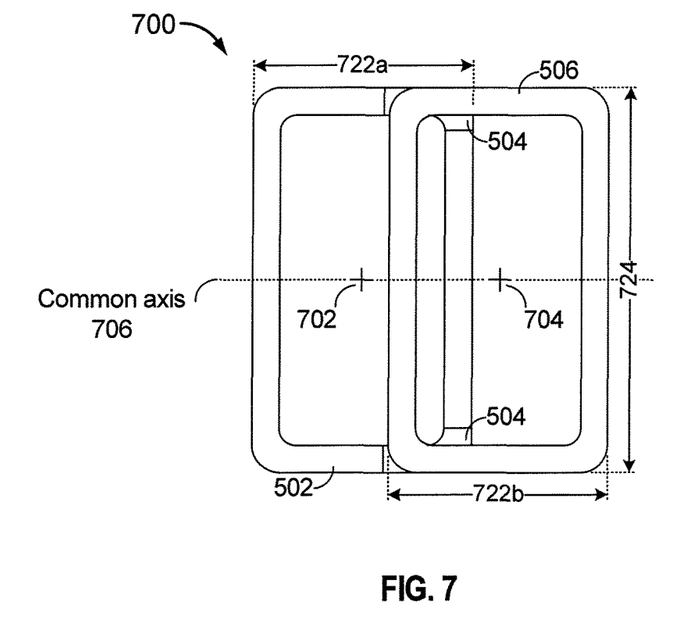
FIG. 7 is a diagram of the bipolar wireless power transfer system of FIG. 5 as viewed from above, in accordance with an exemplary implementation.

FIG. 7 is a diagram 700 of a bipolar wireless power transfer system as viewed from above, in accordance with an exemplary implementation. For example, the diagram 700 may show a bipolar wireless power transfer similar to the system of FIG. 5 as viewed along and in the opposite direction of the "z" arrow. As shown, the first coil 502 and the second coil 506 overlap in a direction substantially parallel to a common axis 706 defined by a straight line passing through a first center point 702 of the first coil 502 and a second center point 704 of the second coil 506. The common axis 706 also defines a common direction of polarization between the first coil 502 and the second coil 506 such that the common axis 706 and the direction of polarization may be in the direction of horizontal magnetic flux generated by the first and second coils 502/506 between a pole that is located within the first coil 502 and a pole that is located within the second coil 506 based on how current is driven into the first and second coils 502/506. For the purpose of this application, the term "center point" may be understood to be a center point of a moment of inertia of the coil or of a projected area defined by an outermost loop of the coil. For symmetrical coils, the "center point" may be an intersection of a major diameter (or dimension) of a coil and a minor diameter (or dimension) of that coil. In other words, the first center point 702 of the first coil 502 may be understood to be the intersection of the midpoint of the first dimension 522a (minor diameter or dimension) of the first coil 502 and the midpoint of the second dimension 524 of the first coil 502. Likewise, the second center point 704 of the second coil 506 may be understood to be the intersection of the midpoint of the first dimension 522b (minor diameter or dimension) of the second coil 506 and the midpoint of the second dimension 524 of the second coil 506. Thus, as shown, the center points 702 and 704 of the first and second coils 502 and 506 may not necessarily be a point on the each coil itself, but may be a point within an area defined by each coil.

Figure 8:
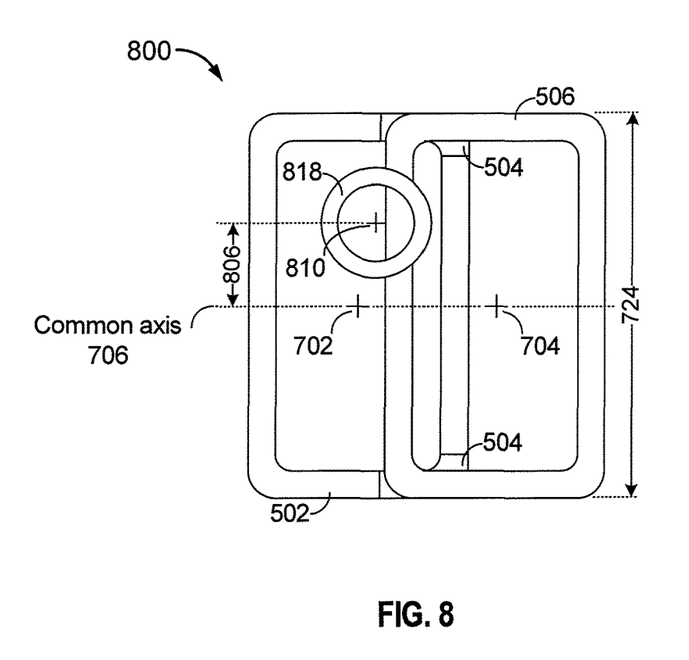
FIG. 8 is a diagram of the bipolar wireless power transfer system of FIG. 5 as viewed from above including a receive coil, in accordance with an exemplary implementation.

In some implementations, the respective first dimensions 722a and 722b of the respective first and second coils 502 and 506 may be substantially parallel to the common axis 706 and may be shorter than a respective second dimension 724 that are each substantially perpendicular to the common axis 706. Because the second coil 506 overlaps the first coil 502 in the direction of the common axis 706, a vehicle to be wirelessly charged will experience a substantially even coupling with the bipolar wireless power transfer system even when the vehicle moves in the direction of the common axis 706 (e.g., left to right or right to left as viewed in FIGS. 7 and/or 8). Thus, movement of the vehicle in the direction of the common axis 706 will not substantially affect the charging or power transfer capability of the bipolar wireless power transfer system 700. However, because the coils do not overlap in the perpendicular direction, similar immunity to a reduction in charging or power transfer capability due to movement of the vehicle in the perpendicular direction may not be achieved where the dimension 724 is substantially the same as or shorter than either of the dimensions 722a and 722b. Accordingly, by increasing the dimension 724 of either or both of the first coil 502 and the second coil 506 such that the dimensions 722a and 722b are shorter than the dimension 724, a greater immunity to a reduction in charging or power transfer capability due to movement of the vehicle in the direction perpendicular to the common axis 706 may be achieved. Thus, in some implementations, an aspect ratio of the first dimensions 722a or 722b to the second dimension 724 may be 1:2, 1:3, 1:4, or any other ratio where the second dimension 724 is larger than the first dimensions 722a or 722b.

In one implementation, the first coil 502 may be driven with a first current (not shown) and the second coil 506 may be driven with a second current (not shown). In such an implementation, the first current may flow with a different magnitude and phase as compared to the second current. Equal phase may correspond to current flowing in the same direction while antiphase (180 degrees) may correspond to currents flowing in an opposite direction. For example, in one antiphase configuration, the first current may flow in a clockwise direction, while the second current may flow in a counterclockwise direction, or vise versa. In an equal phase configuration, both first and second currents may flow in a clockwise direction, or alternatively in a counterclockwise direction. The first current flowing through the first coil 502 and the second current flowing through the second coil 506 may induce a magnetic flux that may be coupled to a receive coil (shown as receive coil 818 in FIG. 8). It is noted that the bipolar wireless power transfer system 700 of FIG. 7 may be configured to act as a transmitter configured to a field for transferring power or receiver configured to wirelessly receive power via a field.

FIG. 8 is a diagram 800 of the bipolar wireless power transfer system of FIG. 5 as viewed from above including a receive coil, in accordance with an exemplary implementation. The diagram 800 may include substantially all features of the diagram 700 of FIG. 7 however, additionally including a receive coil 818. The receive coil 818 has a center point 810 defined as previously described in connection with FIG. 7. The receive coil 818 may be a part of a wireless vehicle charging or power transfer system, for example. In practice, a vehicle including the receive coil 818 may not always precisely align with the common axis 706 of the first and second coils 502 and 506. Thus, in some implementations, the receive coil 818 may be offset from the common axis 706 of the first and second coils 502 and 506 by a predetermined distance 806. The distance 806 may be expressed in absolute terms, as a particular distance, for example, a certain number of centimeters or inches. In the alternative, the distance 806 may be expressed in relative terms as compared to one or more other dimensions, for example, as a percentage of the second dimension 724 of the first and second coils 502 and 506. In some implementations, the distance 806 may be a distance greater than or equal to 15% of the second dimension 724. In other implementations, the distance 806 may be a distance less than 15% of the second dimension 724. Thus, as previously described in connection with FIG. 7, by virtue of the dimension 724 being larger than the dimension 722a and 722b, a greater immunity to a reduction in charging or power transfer capability due to movement of the vehicle, and thus the receive coil 818, in the direction perpendicular to the common axis 706 may be achieved. It is noted that the system as described with reference with FIGS. 7 and 8 may be configured with or without a coil countersunk into a ferrite portion as described above with reference to FIGS. 5 and 6.

Figure 9:
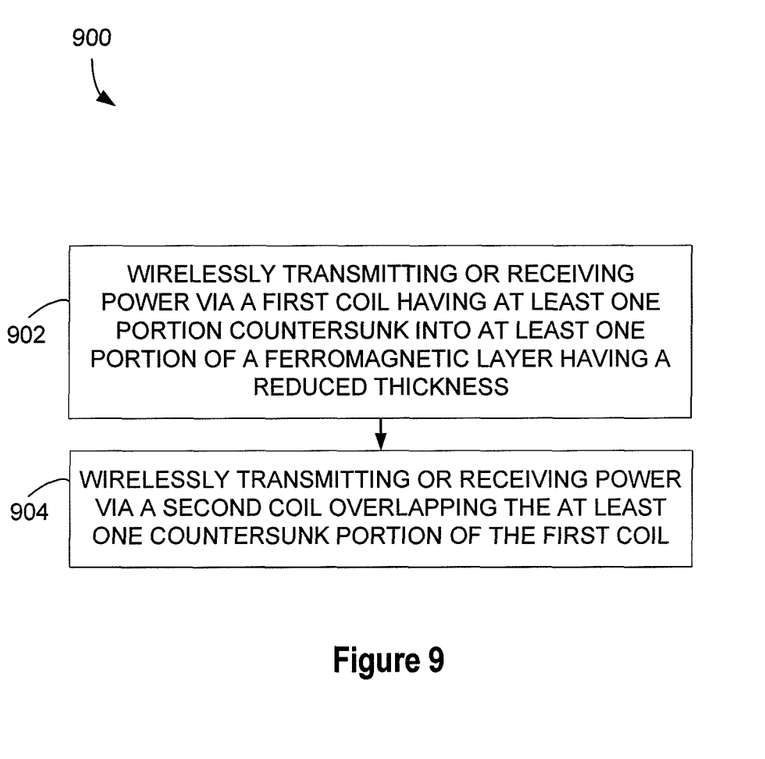
FIG. 9 illustrates a flowchart of a method for wireless power transfer, in accordance with an exemplary implementation.

FIG. 9 illustrates a flowchart 900 of a method for wireless power transfer, in accordance with an exemplary implementation. The method of flowchart 900 is described herein with reference to the bipolar wireless power transfer system previously described in connection with FIGS. 5-8. Although the method of flowchart 900 is described herein with reference to a particular order, in various embodiments, steps herein may be performed in a different order, or omitted, and additional steps may be added.

Operation block 902 includes wirelessly transmitting or receiving power via a first coil having at least one portion countersunk into at least one portion of a ferromagnetic layer having a reduced thickness. For example, the first coil 502, as shown in FIG. 5, may have at least one portion 504 countersunk into the at least one portion 512 of the ferromagnetic layer 508 having the reduced thickness. As previously described, the ferromagnetic layer may be formed from a single ferrite sheet machined to include the at least one portion, from a plurality of ferrite tiles generally having a first thickness and a second plurality of ferrite tiles having a second, reduced thickness as compared to the first thickness, within the at least one portion 512 having the reduced thickness. This operation allows a second coil 506 to overlap the first coil 502 without increasing the total height of the bipolar wireless power transfer system 500.

Operation block 904 includes wirelessly transmitting or receiving power via a second coil overlapping the at least one countersunk portion of the first coil. For example, the second coil 506 may be disposed over the ferromagnetic layer 508 such that second coil 506 overlaps the at least one countersunk portion 504 of the first coil 502. Because the second coil 506 is substantially planar and not bent over or under the first coil 502, the total height of the bipolar wireless power transfer system 500 may not increase as compared to a single coil transfer system.

Figure 10:
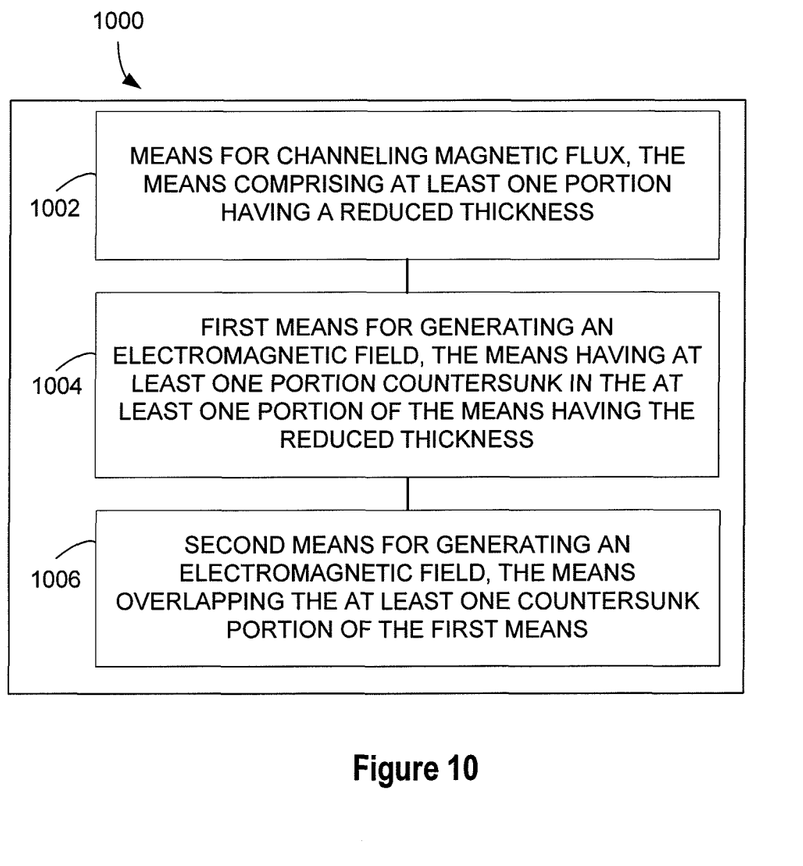
FIG. 10 illustrates an example of a functional block diagram of a bipolar wireless power transfer apparatus, in accordance with an exemplary implementation.

FIG. 10 illustrates an example of a functional block diagram of a bipolar wireless power transfer apparatus 1000, in accordance with an exemplary implementation. Those skilled in the art will appreciate that a bipolar wireless power transfer apparatus may have more components than the simplified bipolar wireless power transfer apparatus 1000 shown in FIG. 10. The bipolar wireless power transfer apparatus 1000 shown includes only those components useful for describing some prominent features of implementations within the scope of the claims.

The bipolar wireless power transfer apparatus 1000 includes means 1002 for channeling magnetic flux, the means 1002 comprising at least one portion having a reduced thickness. In some implementations, the means 1002 may comprise a ferromagnetic layer, for example a ferrite layer, and may channel magnetic flux generated by nearby coils, for example, as shown in FIG. 5. In various implementations, the means 1002 can be implemented by the ferromagnetic layer 508 shown in FIGS. 5 and 6.

The apparatus 1000 may additionally include first means 1004 for generating an electromagnetic field, the means 1004 having at least one portion countersunk in the at least one portion of means 1002 having the reduced thickness. In some implementations, the means 1004 may be implemented by the first coil 502 shown in FIG. 5 for example.

The apparatus 1000 may additionally include second means 1006 for generating an electromagnetic field, the means 1006 overlapping the at least one countersunk portion of the first means 1004. In some implementations, the means 1006 may be implemented by the second coil 506 shown in FIG. 5 for example.

Figure 11:
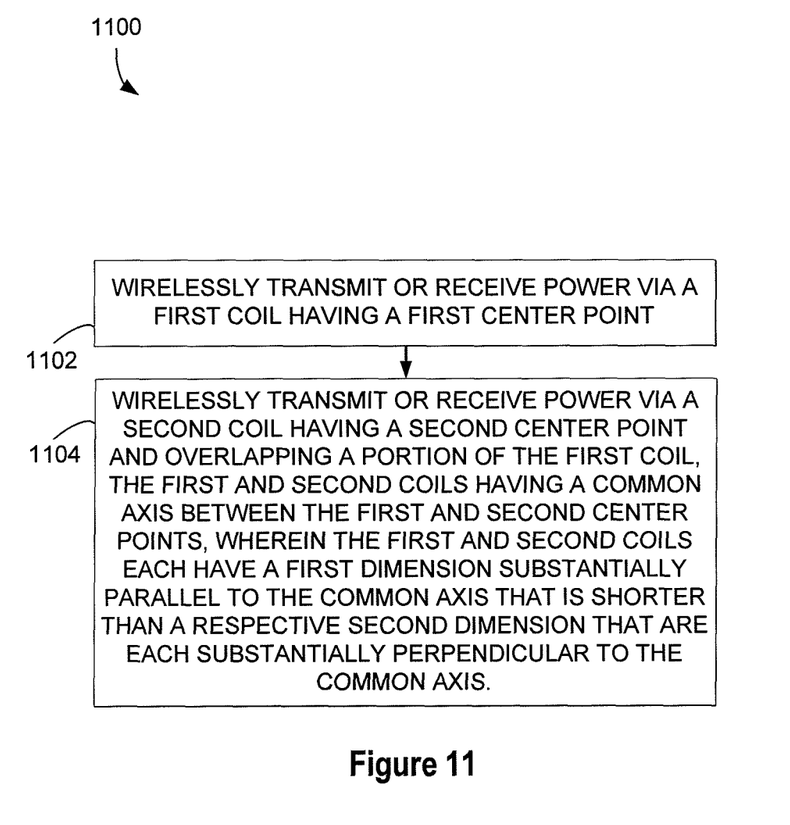
FIG. 11 illustrates another flowchart of a method for wireless power transfer, in accordance with an exemplary implementation.

FIG. 11 illustrates another flowchart 1100 of a method for wireless power transfer, in accordance with an exemplary implementation. The method of flowchart 1100 is described herein with reference to the bipolar wireless power transfer system previously described in connection with FIGS. 5-8. Although the method of flowchart 1100 is described herein with reference to a particular order, in various embodiments, steps herein may be performed in a different order, or omitted, and additional steps may be added.

Operation block 1102 includes wirelessly transmitting or receiving power via a first coil having a first center point. For example, the first coil 502, as shown in FIG. 7 or 8, may have the center point 702.

Operation block 1104 includes wirelessly transmitting or receiving power via a second coil having a second center point. The second coil 506 may overlap a portion of the first coil 502. The first and second coils 502 and 506 may have a common axis 706 between the first and second center points 702 and 704. In addition, the first and second coils 502 and 506 each have a first dimension 722a and 722b substantially parallel to the common axis 706 that is shorter than a respective second dimension 724 that are each substantially perpendicular to the common axis 706. Accordingly, the first dimensions being shorter than the second dimensions allows for an increased immunity or resistance to uneven coupling between the transfer system and a vehicle when the vehicle (and associated receive coil) is moved slightly in the directions parallel and/or perpendicular to the common axis of the first and second coils.

Figure 12:
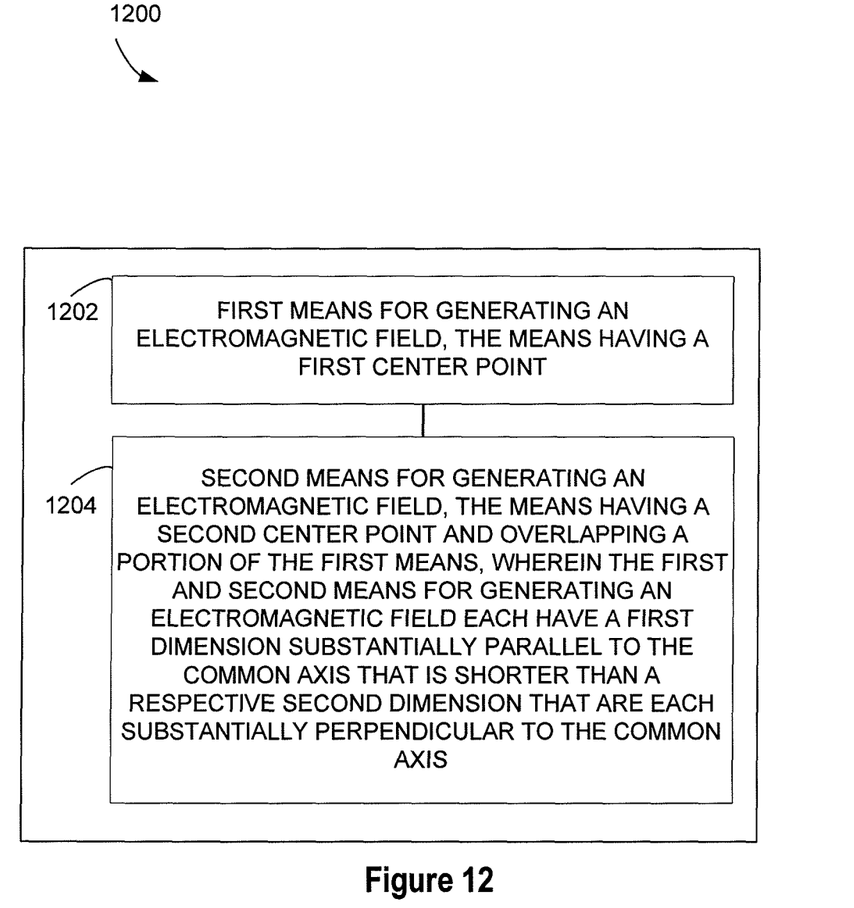
FIG. 12 illustrates an example of a functional block diagram of another bipolar wireless power transfer apparatus, in accordance with an exemplary implementation.

FIG. 12 illustrates an example of a functional block diagram of another bipolar wireless power transfer apparatus 1200, in accordance with an exemplary implementation. Those skilled in the art will appreciate that a bipolar wireless power transfer apparatus may have more components than the simplified bipolar wireless power transfer apparatus 1200 shown in FIG. 12. The bipolar wireless power transfer apparatus 1200 shown includes only those components useful for describing some prominent features of implementations within the scope of the claims.

The apparatus 1200 may include first means 1202 for generating an electromagnetic field, the means 1202 having a first center point 702. In some implementations, the means 1202 may be implemented by the first coil 502 shown in any of FIGS. 5, 7 and 8 for example.

The apparatus 1200 may additionally include second means 1204 for generating an electromagnetic field, the means 1204 having a second center point 704 and overlapping a portion of the first means 1202, the first and second means 1202/1204 having a common axis 706 between the first and second center points 702/704, wherein the first and second means for generating an electromagnetic field 502/506 each have a first dimension 722a/722b substantially parallel to the common axis 706 that is shorter than a respective second dimension 724 that are each substantially perpendicular to the common axis 706. In some implementations, the means 1204 may be implemented by the second coil 506 shown in any of FIGS. 5, 7 and 8 for example.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations of the invention.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular implementation of the invention. Thus, the invention may be embodied or carried out in a manner that achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An apparatus for wireless power transfer, comprising:
a ferromagnetic layer comprising at least one first portion having a first thickness and a plurality of second portions, each having a second thickness less than the first thickness;
a first coil having a first section that rests on the at least one first portion, a plurality of second sections, each of which rests on one of the plurality of second portions of the ferromagnetic layer, and a third section that rests on the at least one first portion, the third section positioned between the plurality of second sections, the plurality of second sections of the first coil not coplanar with the first section, and the first coil configured to be driven with a first current; and
a second coil overlapping the plurality of second sections of the first coil and configured to be driven with a second current different from the first current,
the first and second coils configured to generate a magnetic field that is adjusted based on varying a magnitude or a phase of at least one of the first and second currents.

2. The apparatus of claim 1, wherein each of the plurality of second portions comprises a recess in the ferromagnetic layer.

3. The apparatus of claim 1, wherein each of the plurality of second portions comprises a complete removal of the ferromagnetic layer.

4. The apparatus of claim 1, further comprising a shield layer having at least one portion recessed or removed that is substantially aligned with each of the plurality of second portions of the ferromagnetic layer.

5. The apparatus of claim 1, wherein the ferromagnetic layer comprises a first plurality of ferromagnetic tiles having the first thickness and a second plurality of ferromagnetic tiles having the second thickness that is less than the first thickness.

6. The apparatus of claim 1, wherein the ferromagnetic layer, the first coil and the second coil form a bipolar wireless power transmitter or receiver.

7. The apparatus of claim 1, wherein the first and second coils are configured to generate a magnetic flux for coupling to at least one receive coil.

8. The apparatus of claim 1, wherein any section of the first coil which does not rest on one of the plurality of second portions of the ferromagnetic layer is generally coplanar with the second coil.

9. The apparatus of claim 1, wherein the plurality of second sections of the first coil is offset below the first section by a distance equal to a thickness of the first coil.

10. The apparatus of claim 1, wherein the first coil additionally has the third section, the second coil overlapping the third section of the first coil.

11. A method for wireless power transfer, comprising:
wirelessly transmitting or receiving power via a first coil having a first section that rests on a first portion of a ferromagnetic layer having a first thickness, a plurality of second sections, each of which rests on one of a plurality of second portions of the ferromagnetic layer having a second thickness less than the first thickness, and a third section that rests on the first portion, the third section positioned between two of the plurality of second sections, the first coil driven with a first current and the plurality of second sections not coplanar with the first section; and
wirelessly transmitting or receiving power via a second coil overlapping the plurality of second sections of the first coil, the second coil driven with a second current different from the first current,
the first and second coils generating a magnetic field that is adjusted based on varying a magnitude or a phase of at least one of the first and second currents.

12. The method of claim 11, wherein each of the plurality of second portions comprises a recess in the ferromagnetic layer.

13. The method of claim 11, wherein each of the second portions comprises a complete removal of the ferromagnetic layer.

14. The method of claim 11, further comprising shielding an area from electromagnetic fields via a shield layer comprising at least one recessed or removed portion substantially aligned with the plurality of second portions of the ferromagnetic layer.

15. The method of claim 11, wherein the ferromagnetic layer comprises a first plurality of ferromagnetic tiles having the first thickness and a second plurality of ferromagnetic tiles having the second thickness that is less than the first thickness.

16. The method of claim 11, further comprising utilizing the first and second coils to generate a magnetic flux coupled to at least one receive coil.

17. The method of claim 11, wherein the first section of the first coil is generally coplanar with the second coil.

18. The method of claim 11, wherein each of the plurality of second sections of the first coil is offset below the first section of the first coil by a distance equal to a thickness of the first coil.

19. The method of claim 11, wherein the first coil additionally has the third section that rests on the plurality of second portions of the ferromagnetic layer, the second coil overlapping the third section of the first coil.

20. An apparatus for wireless power transfer, comprising:
a ferromagnetic layer comprising at least one first portion having a first thickness and a plurality of second portions, each having a second thickness less than the first thickness, the at least one of the plurality of second portions having a portion in which the ferromagnetic layer is completely removed;
a first coil having at least two first sections that each rests on one of the plurality of second portions, at least one of the first sections extending into a space of the at least one completely removed portion of the ferromagnetic layer, and a second section disposed between at least two of the plurality of first sections that rests on the at least one first portion, the first coil configured to be driven with a first current; and
a second coil overlapping the plurality of first sections of the first coil and configured to be driven with a second current different from the first current,
the first and second coils configured to generate a magnetic field that is adjusted based varying a magnitude or a phase of at least one of the first and second currents.

21. The apparatus of claim 20, further comprising a shield layer having at least one portion recessed or removed that is substantially aligned with the completely removed portion of the ferromagnetic layer.

22. The apparatus of claim 20, wherein the ferromagnetic layer, the first coil and the second coil form a bipolar wireless power transmitter or receiver.

23. The apparatus of claim 20, wherein the first and second coils are configured to generate a magnetic flux for coupling to at least one receive coil.

24. A method for wireless power transfer, comprising:
wirelessly transmitting or receiving power via a first coil having a plurality of first sections, at least one of which extends into an area of at least one completely removed portion of a ferromagnetic layer and a second section disposed between at least two of the plurality of first sections and resting on a first portion of the ferromagnetic layer having a larger thickness than the removed portion, the first coil configured to be driven with a first current; and
wirelessly transmitting or receiving power via a second coil overlapping the at least two of the first sections of the first coil, the second coil configured to be driven with a second current different from the first current,
the first and second coils generating a magnetic field structure that is adjusted based on varying a magnitude and a phase of at least one of the first and second currents.

25. The method of claim 24, further comprising shielding an area from electromagnetic field via a shield layer comprising at least one recessed or removed portion substantially aligned with the at least one completely removed portion of the ferromagnetic layer.

26. The method of claim 24, further comprising utilizing the first and second coils to generate a magnetic flux coupled to at least one receive coil.

* * * * *